United States Patent Office
2,954,863
Patented Oct. 4, 1960

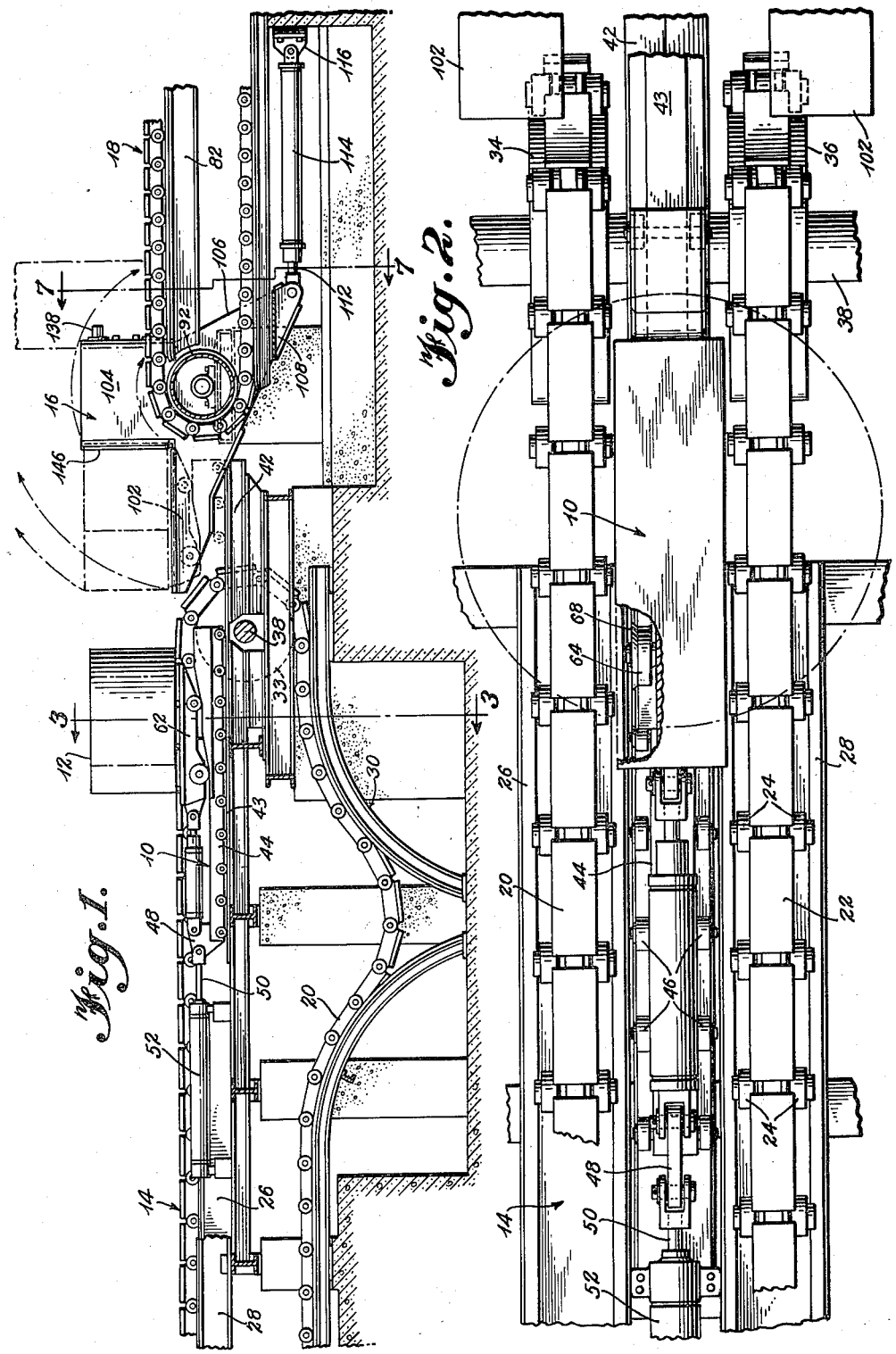

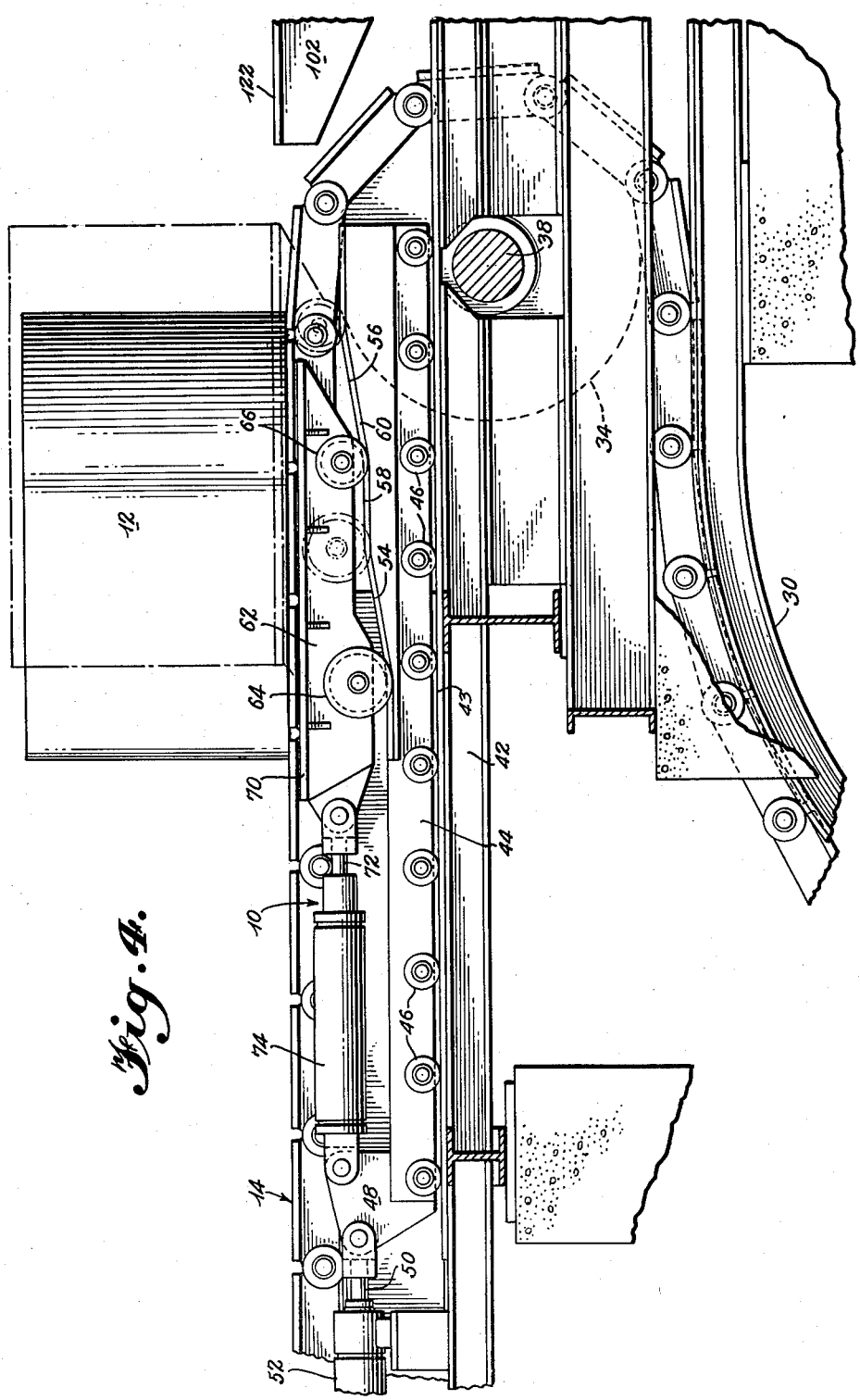

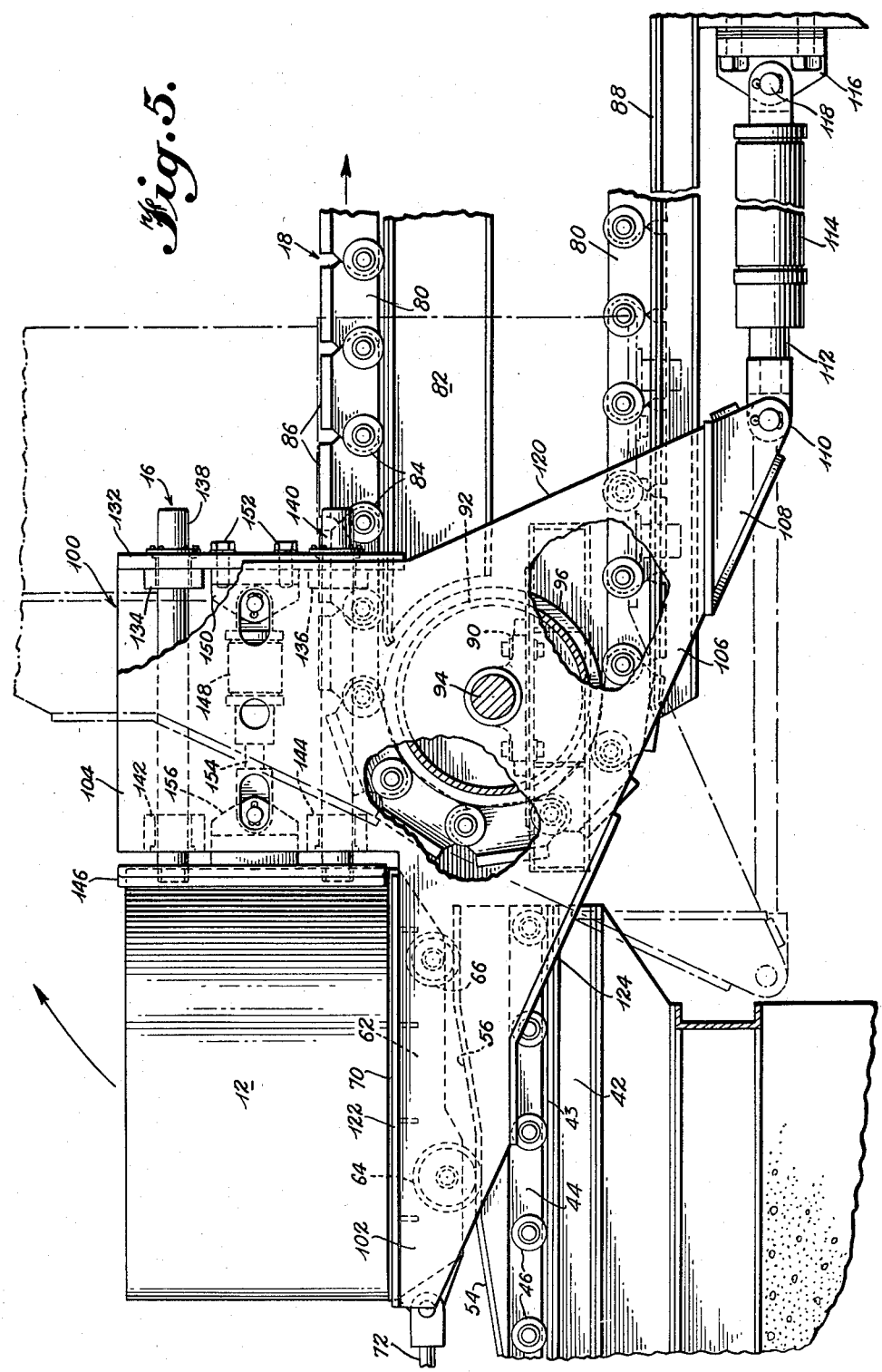

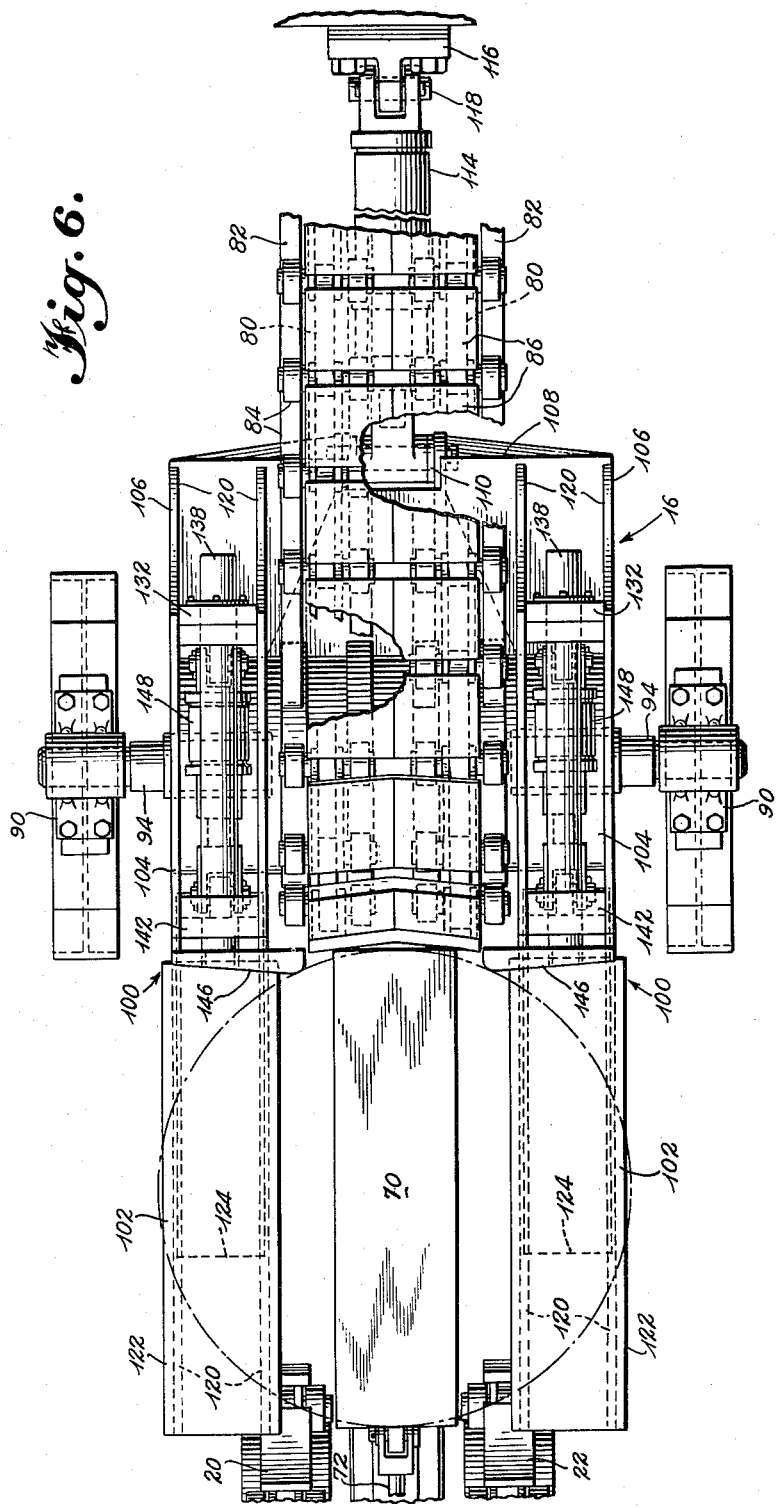

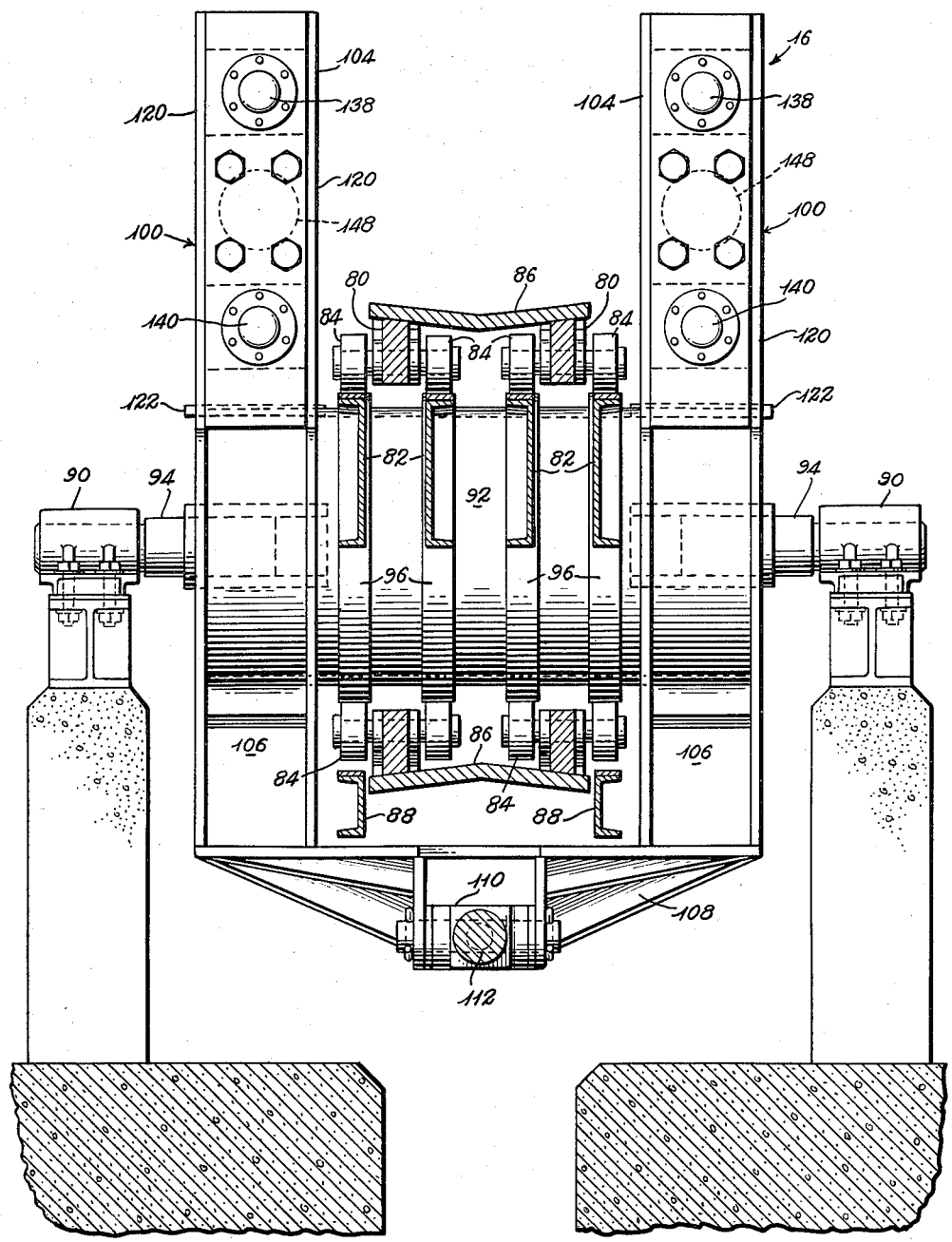

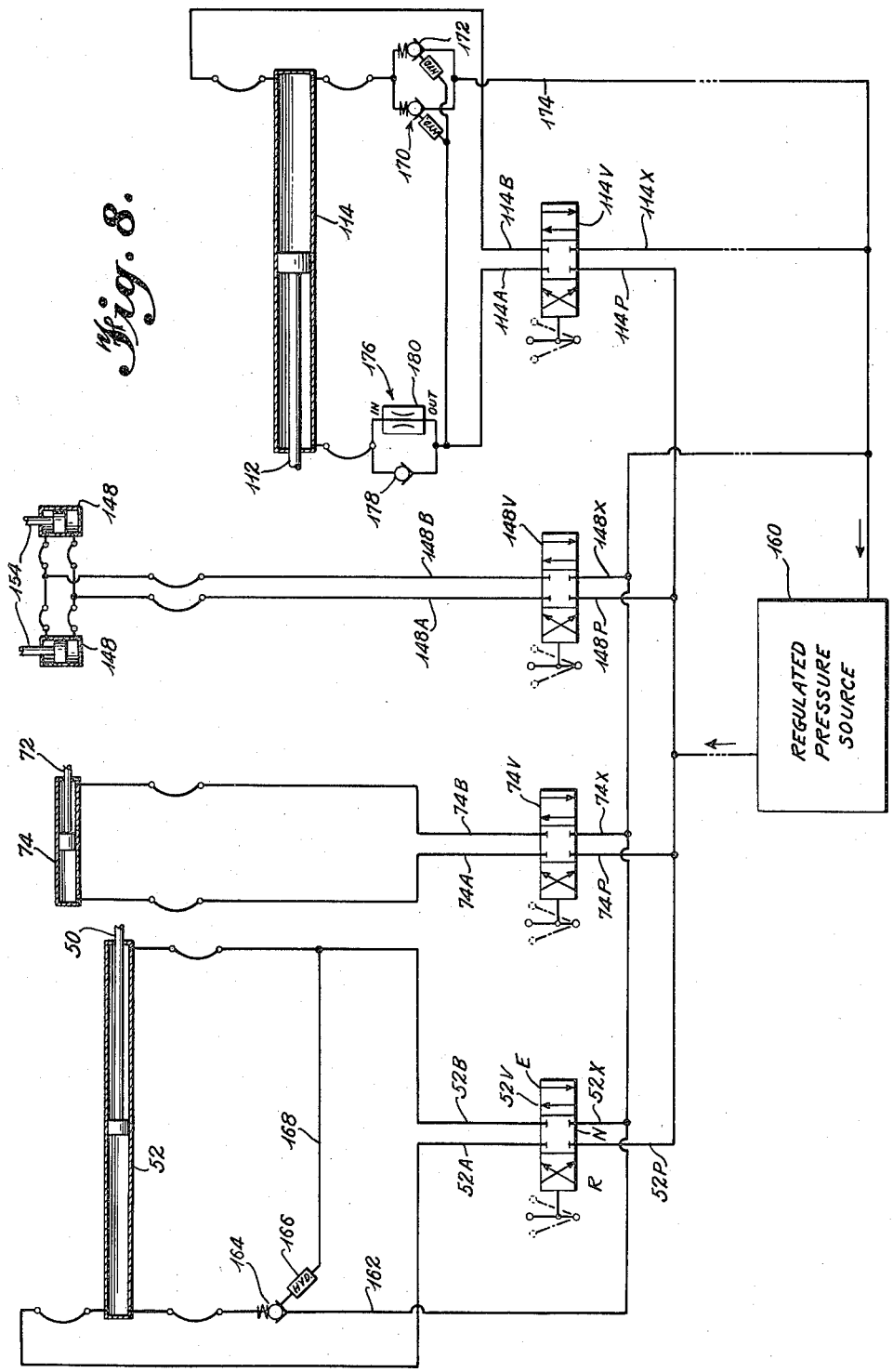

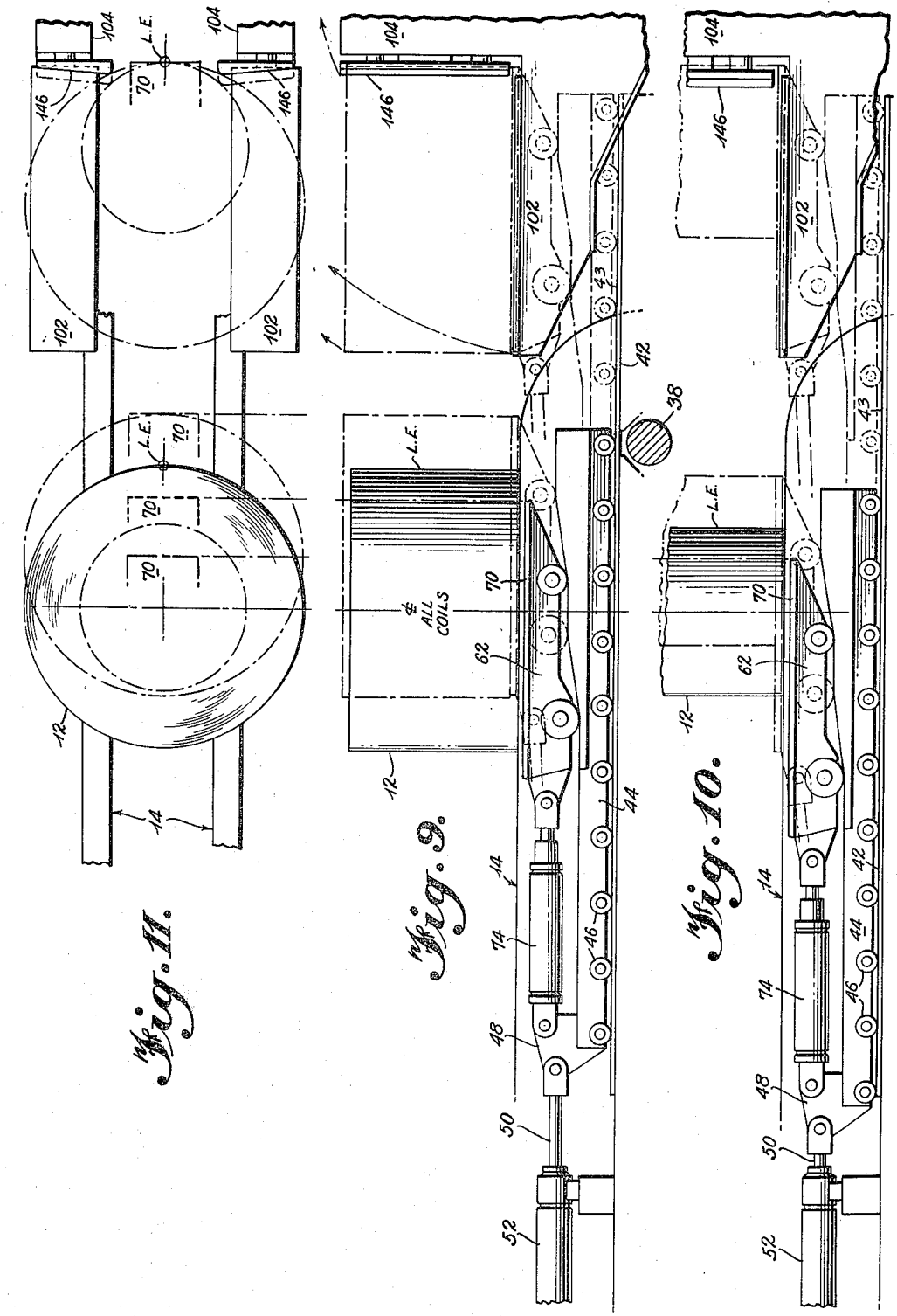

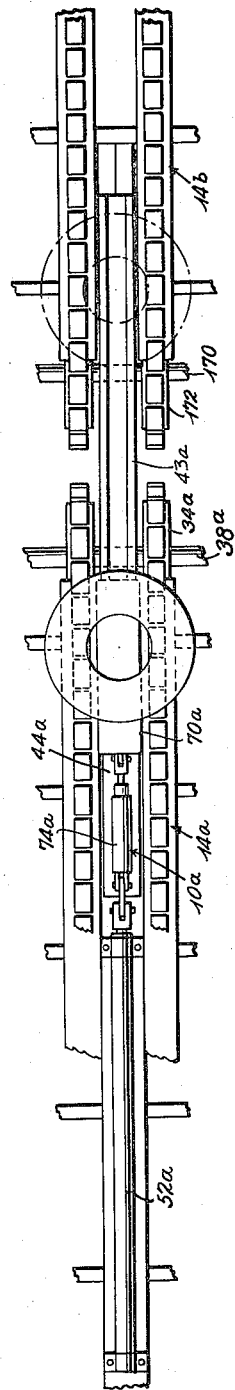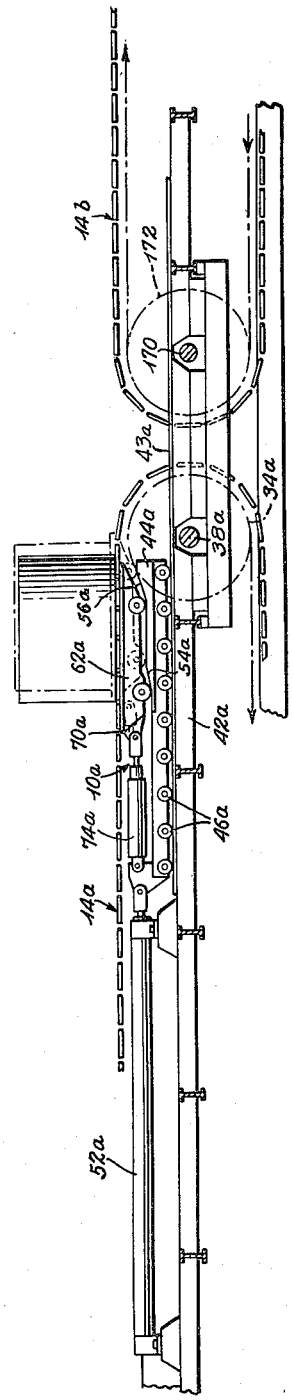

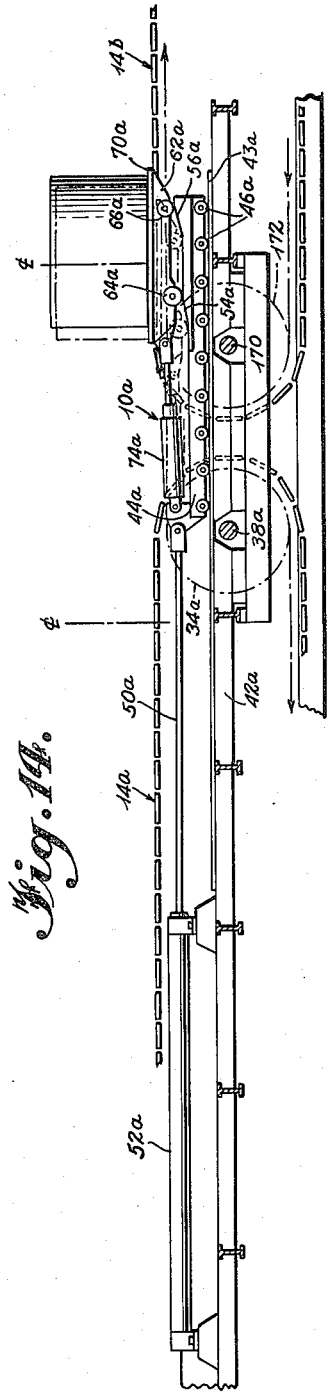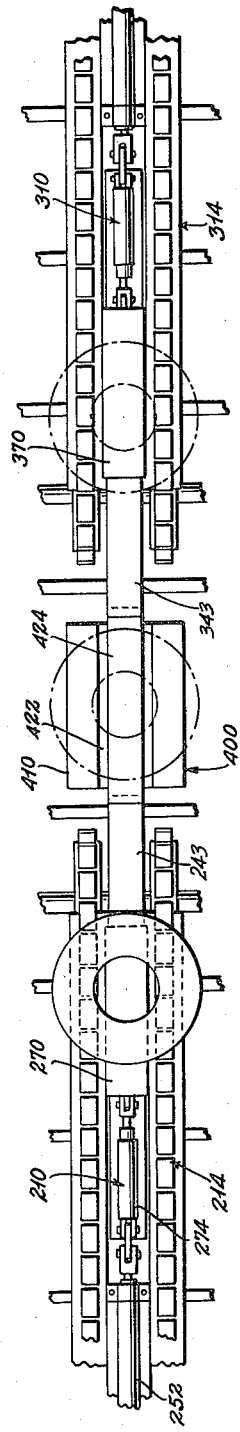

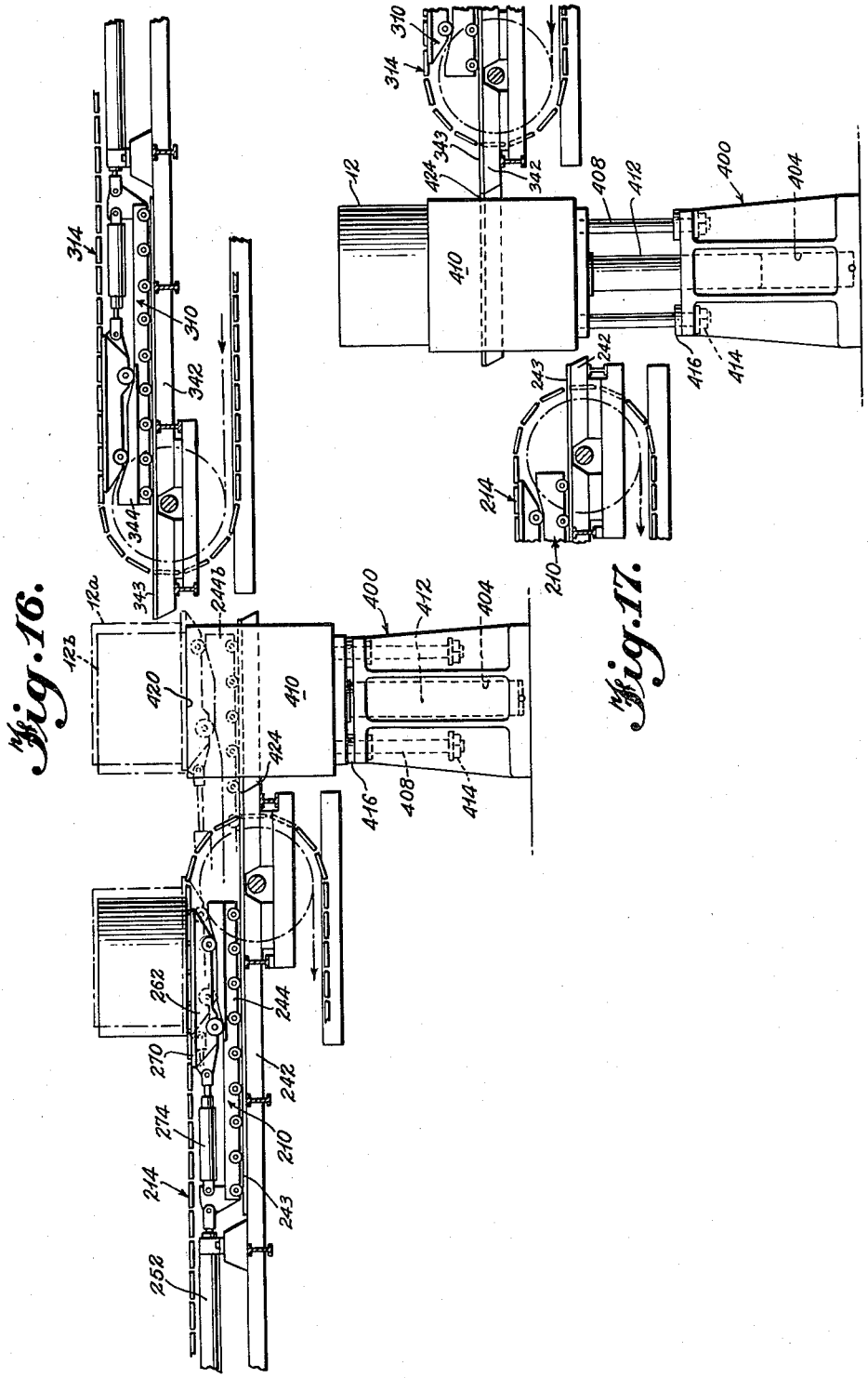

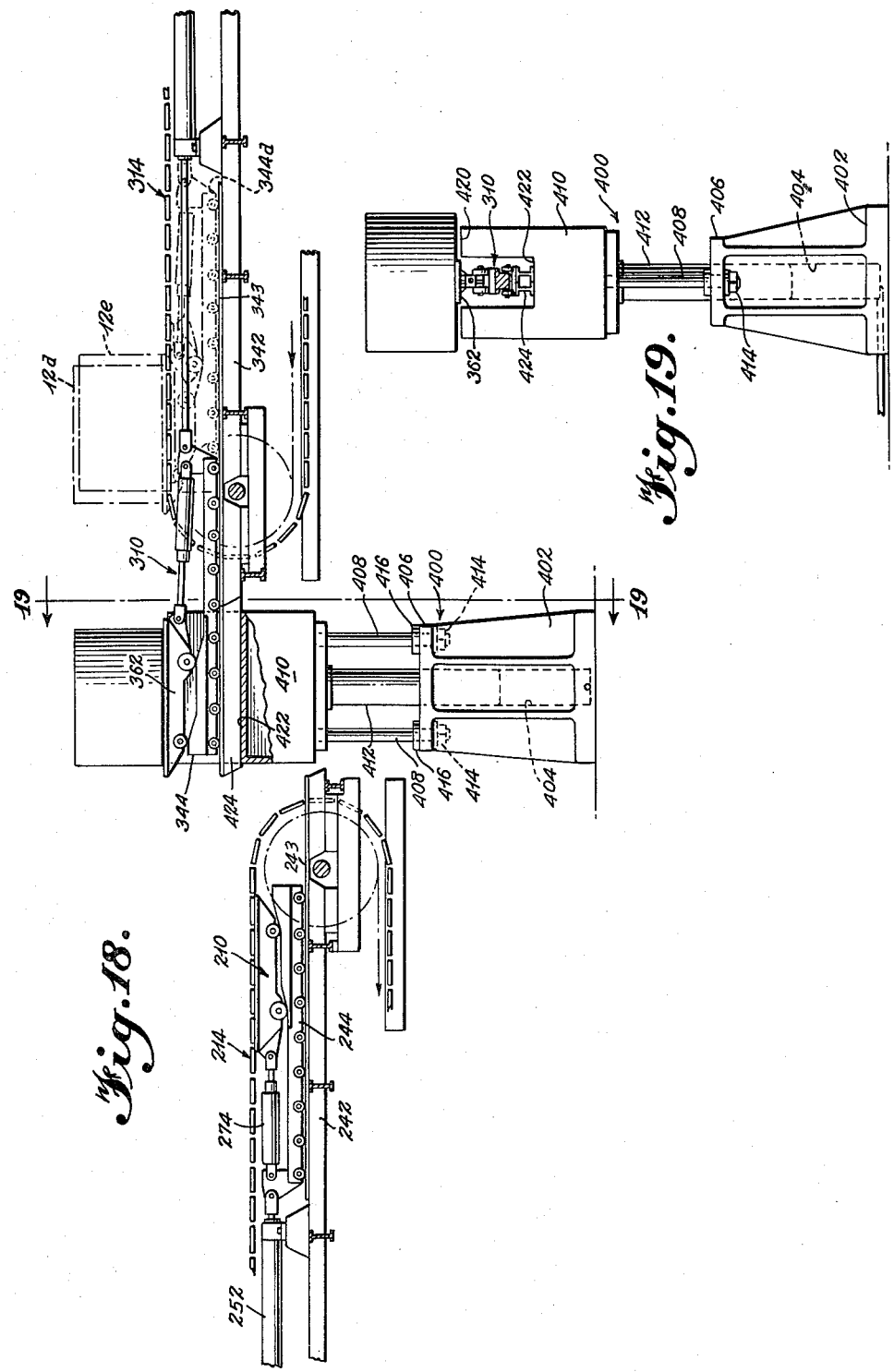

2,954,863

ARTICLE HANDLING APPARATUS

Robert G. Staples, Jr., North Wales, Pa., assignor to Link-Belt Company, a corporation of Illinois Filed Sept. 20, 1957, Ser. No. 685,192

19 Claims. (Cl. 198—33)

This invention relates to article handling apparatus, and more particularly to apparatus for transferring coiled strips of sheet material between conveyors during processing, as in steel mill operations.

While the invention is particularly adapted for use in steel mill conveyor systems handling coils of rolled strip material, certain of the broader aspects are of more general utility. In the handling of coils of the aforementioned type, it is quite often desirable to transfer the coils between conveyors which may be driven at different rates of speed, as for example transferring a coil from a conveyor passing the coil through a cooling operation to a conveyor where the coil may be stored for some length of time. Certain problems have arisen in connection with such transfers of coils, particularly in view of the fact that the outside diameter of the cylindrical coils may vary considerably due to the differing lengths of strip material which make up the respective coils. The differing diameters of coils are of especial concern during handling operations involving the tilting of the coils during its transfer from one conveyor to the next.

A primary object of the invention is to provide article handling apparatus for removing an article from a conveyor at a location on the conveyor selected in accordance with a dimension of the article and positioning the removed articles clear of the conveyor for further handling.

A further primary object of the invention is to provide article handling apparatus for removing an article from a conveyor and locating the removed article at a position selected in accordance with a dimension of the article for further handling.

Still another object of the invention is to provide article handling apparatus for removing cylindrical articles of differing diameters from a conveyor upon which the articles are disposed in an upright position and transferring the articles to a position wherein the leading edge of the transferred article is disposed at a position common to articles of all diameters.

Still another object of the invention is to provide article handling apparatus for removing cylindrical articles of differing diameters from a conveyor upon which the articles are disposed in an upright position and tilting the removed articles into a generally horizontal delivery position at which the lower-most portion of the side of the tilted article is located at a position common to articles of all diameters.

A further object of the invention is to provide article handling apparatus capable of transferring articles between inline conveyors having conveying surfaces disposed at different levels.

Further objects and advantages of the invention will become apparent by reference to the following specification taken in conjunction with the accompanying drawings. In the drawings:

Figure 1 is a longitudinal cross-sectional view of one form of apparatus embodying the invention;

Figure 2 is an enlarged plan view showing a portion of the apparatus of Figure 1;

Figure 4 is an enlarged longitudinal cross-sectional view of a portion of the apparatus of Fig. 1;

Figure 5 is an enlarged detailed side view of another portion of the apparatus shown in Fig. 1;

Figure 6 is a plan view of the portion of the Fig. 1 apparatus shown in Fig. 5;

Figure 7 is a transverse cross-sectional view taken on the line 7—7 of Fig. 1;

Figure 8 is a schematic view of the hydraulic system employed in the apparatus of Fig. 1;

Figures 9, 10 and 11 are schematic views showing various stages of the operation of the structure shown in Fig. 1;

Figure 12 is a partial plan view of another apparatus embodying my invention;

Figure 13 is a side view of the apparatus of Fig. 12 showing the same in one phase of its operation;

Figure 14 is a view similar to Fig. 13 showing the apparatus in another phase of its operation;

Figure 15 is a partial plan view of still another embodiment of my invention;

Figure 16 is a side view of the apparatus of Fig. 15 showing certain phases of the operation of the said apparatus;

Figure 17 is a partial view of the structure of Fig. 16 showing the parts in another operational phase;

Figure 18 is a view similar to Fig. 16 showing still another phase of the operation of the Fig. 15 apparatus and Figure 19 is a transverse cross-sectional view taken on the line 19—19 of Fig. 18.

Figure 3:
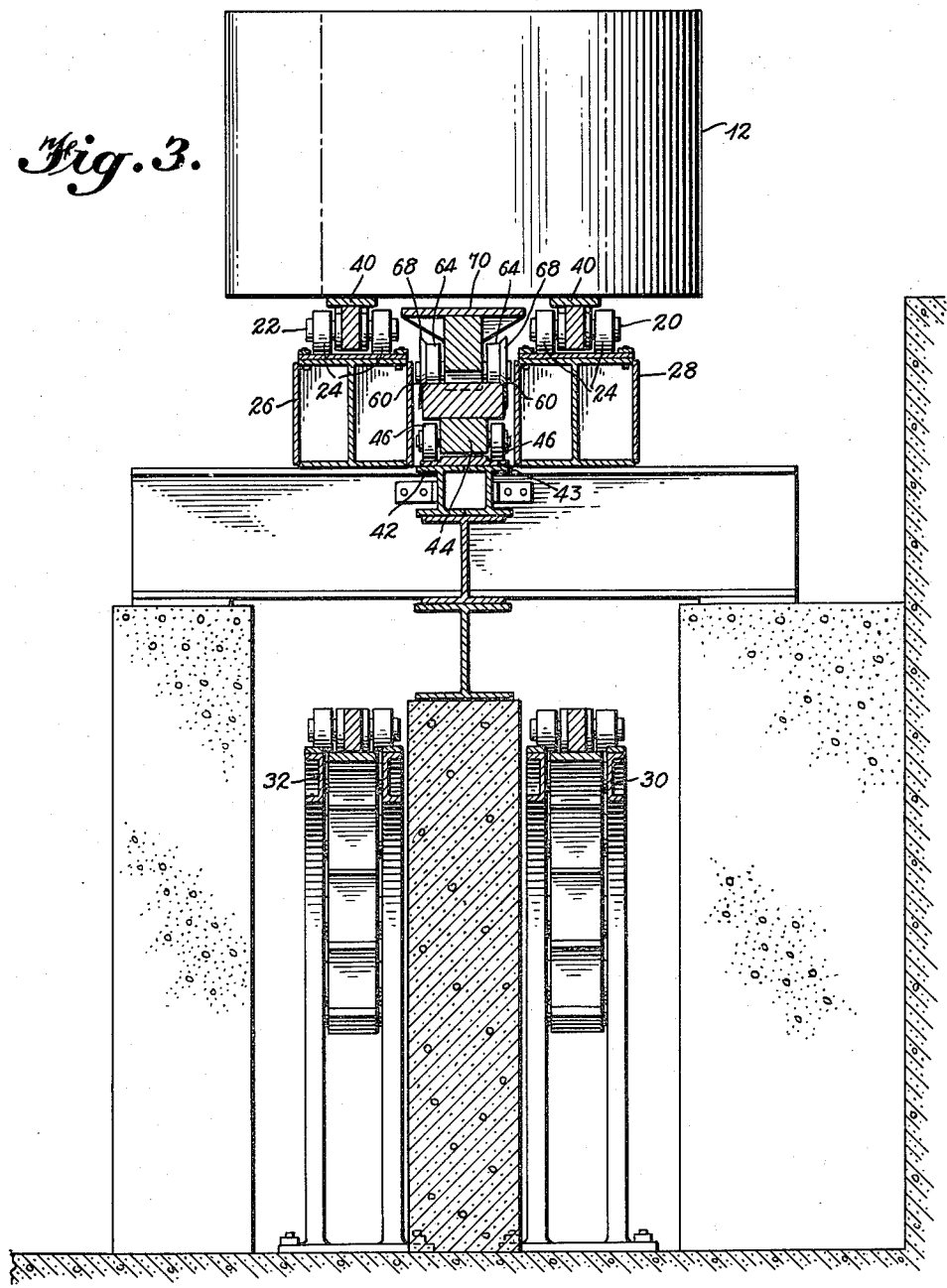
Figure 3 is a transverse cross-sectional view taken on the line 3—3 of Figure 1.

Referring first to Figs. 1 through 4, a transfer assembly, designated generally by the numeral 10, is located to transfer coils 12 of strip material from a double chain apron conveyor designated generally 14 to a tilting mechanism 16 which is arranged to load the coils 12 into the second apron conveyor 18.

The conveyor 14 is of more or less conventional construction and includes a pair of spaced parallel endless conveying chains 20 and 22, each comprising a series of articulated links which are supported by rollers 24 for movement along fixed track members 26 and 28 and return track assemblies 30 and 32 in a manner well known in the art. The chains 20 and 22 are driven by a pair of sprockets 34 and 36, respectively, each of the sprockets being fixed to a common drive shaft 38 which is driven by suitable means, not shown. Each individual link of the chains 20 and 22 is provided with an apron 40, upon a suitable number of which a coil of strip material 12 may be supported during movement of the chains 20 and 22.

The transfer assembly 10 is mounted upon the fixed frame of the conveyor 14 and includes a track 42 which is centrally located between the chain carrying tracks 26 and 28 and extends longitudinally of the conveyor 14 between the drive sprockets 34 and 36 to a location beyond the discharge end of the conveyor 14, with the upper portion or tread 43 of the track 42 passing above the sprocket shaft 38. An elongated carriage 44 is mounted for movement upon the tread 43 of the track 42 by a series of transversely opposed rollers 46 which are rotatably supported upon the carriage 44. At its rearward end, the carriage 44 is provided with a fixed lug 48 by means of which the carriage 44 is coupled to the piston rod 50 of an expansible chamber motor 52 which is fixedly connected to the frame of the conveyor 14. By suitable hydraulic connections, described in more detail below, the motor 52 may be actuated to move the carriage 44 from a location wherein the piston rod 50 is retracted into the cylinder of the motor 52 to the degree illustrated in Fig. 4 to a position wherein the piston rod is fully extended, at which time the right hand end of the carriage 44 will assume the dotted line position illustrated in Fig. 1.

At its forward end, the carriage 44 is provided with two spaced upwardly inclined surfaces 54 and 56 separated by an intermediate horizontal surface portion 58. The outer side edges of the surfaces 54, 56 and 58 are beveled as at 60 (see Fig. 3), and the beveled edges 60 are extended rearwardly from the lower end of the inclined surface 54 and forwardly from the upper end of the inclined surface 56. A second carriage 62 is mounted upon the carriage 44 by means of two opposed pairs of wheels 64 and 66. As best seen in Fig. 3, the wheels 64 and 66 are formed with beveled flanges 68 which are complementary to the beveled surfaces 60 on the carriage 44 whereby the surfaces 54, 56, 58 and 60 define a track upon the carriage 44 for guiding movement of the carriage 62 relative to the carriage 44. A platform 70 is fixedly mounted upon the upper surface of the carriage 62 and serves to engage and support a coil above the conveying surface of the conveyor 14 when the carriage 62 is located in the dotted line position of Figure 4.

The carriage 62 is coupled at its rearward end to the piston rod 72 of an expansible chamber motor 74. The motor 74 is pivotally supported at its rearward end upon the lug 48, hence actuation of the motor 74 serves to drive the carriage 62 from its retracted position, shown in full line in Fig. 4, forwardly to the dotted line position of Fig. 4. Due to the inclination of the surfaces 54 and 56, it will be appreciated that this forward movement of the carriage 62 along these surfaces elevates the platform 70 from a retracted position, wherein the platform is located below the conveying surface of the conveyor 14, to an article supporting position, wherein the platform 70 elevates an article clear above the conveying surface of the conveyor 14.

In Fig. 1, the transfer assembly 10 described above is shown in combination with a tilting mechanism 16 whereby coils of strip material 12 which are conveyed upon the conveyor 14 in an upright position; i.e., with the longitudinal axis of the coil extending in a vertical direction, are removed from conveyor 14, tilted through an angle of 90° to orient the longitudinal axis of the coil in a substantially horizontal direction, and loaded upon the second conveyor 18.

As best seen in Figs. 5, 6 and 7, the conveyor 18 includes a pair of spaced endless carrying chains 80 which are supported respectively upon a pair of spaced carrying track assemblies 82 by rollers 84. The links of the respective chains 80 are transversely aligned with each other and each aligned pair of links jointly supports a transversely extending apron 86 which, as best seen in Fig. 7, is depressed in its central portion to present a shallow V-shaped transverse cross section. The return run of the chains 80 is supported upon a return track 88 suitably supported by means not shown. The chains 80 are driven by any suitable means, the specific means not appearing in the drawings.

The foot shaft assembly of the conveyor 18 is supported upon a pair of pillow blocks 90 and includes a drum like central portion 92 which is supported on the pillow blocks by means of stub shafts 94. Four circumferentially extending track sections 96 are formed upon the drum 92 and serve to engage and guide the rollers 84 of the carrying chain during passage of the chain around the foot shaft assembly.

The coil tilting assembly 16 is fixedly mounted upon the drum 92 and includes a pair of like arm assemblies generally designated 100, one arm assembly being mounted at each end of the cylindrical drum 92. Since each of the arm assemblies 100 is identical with the other, the following description is equally applicable to either.

Referring first to Fig. 5, it will be seen that each of the arm assemblies 100 consists essentially of three arms which project radially from the axis of the foot shaft assembly. For descriptive purposes, these three arms are identified as a coil end engaging arm 102, a coil side supporting arm 104 and a crank arm 106. At their radially outermost ends, the crank arms 106 of both arm assemblies are rigidly interconnected by a cross frame assembly 108 which is pivotally coupled at 110 to the end of a piston rod 112 of an expansible chamber motor 114. The motor 114 is mounted upon the conveyor frame at 116 by means of a horizontally extending pivot pin 118. The motor 114 is hydraulically connected to drive both of the arm assemblies 100 as a unit about the axis of the foot shaft assembly between the full line position of Fig. 5, wherein the coil end engaging arms are disposed in a horizontal plane, to the dotted line position of Figure 5 wherein the coil end engaging arms 102 have been pivoted about the axis of the foot shaft assembly into a vertical position.

As best appreciated from Figs. 6 and 7, each of the arm assemblies is constructed from a pair of spaced side plates 120, each of the side plates 120 including a coil end engaging arm 102, a coil side engaging arm 104 and a crank arm 106 in the respective shapes shown best in Fig. 5. Each of the arm assemblies 100 includes a plate 122 which is secured, as by welding, to the upper surfaces of the paired coil end supporting arm portions 102. As best seen in Fig. 6, the plates 122 define a pair of spaced surfaces for supportingly engaging the end of the coil and are so located as to extend along either side of the platform 70 of the transfer assembly 10 when the platform 70 is located in its extreme forward and upper position. Bracing plates 124 are welded to the lower surfaces of the arm portions 102 to provide further rigidity and structural strength.

The coil end supporting arm assemblies 104 include an end plate 132 which is secured, as by welding, between the side plates 120 along the rearwardmost edges of the arm portions 104. Upper and lower bushing blocks 134 and 136 are fixedly mounted upon the plate 132 and slidingly support the rearward ends of upper and lower guide rods 138 and 140. Upper and lower bearing blocks 142 and 144 are fixedly mounted between the side plates 120 in alignment with the bushings 134 and 136 to support the guide rods 138 and 140 at the opposite side of the coil end supporting arm portion 104. The guide rods 138 and 140 project forwardly through the blocks 142 and 144 and are joined forwardly of the blocks by a coil side engaging saddle member 146.

An expansible chamber motor 148 is mounted upon a bracket 150 which is fixedly secured as by bolts 152 to the plate 132. The piston rod 154 of the motor 148 is coupled to a lug 156 which is fixedly secured, as by welding, to the saddle member 146. It is believed apparent that actuation of the motor 148 will move the saddle member 146 in a direction parallel to the coil end engaging platform 122, the saddle member 146 being guided by the sliding engagement of the guide rods 138 and 140 with the respective members 134, 136, 142 and 144.

The control system for the foregoing embodiment is disclosed in Fig. 8 of the drawings in which a regulated pressure source 160 is connected to each of the motors 52, 74, 114 and 148 through three position reversing valves 52V, 74V, 114V, and 148V, respectively. A single valve 148V is employed for the pair of saddle operating motors 148, since the motors 148 are always operated concurrently. Since all of the valves employed to control the various motors are identical and of conventional construction, only a brief description of the valve 52V will be given, it being understood that the description of this valve is equally applicable to the valve 74V, 114V and 148 V.

The three position valve 52V is manually controlled and is provided with four ports, 52A, 52B, 52P and 52X. The port 52P is connected to the pressure side of the pressure source 160 while the port 52X is an exhaust port which is connected to the return or inlet side of the source 160. The ports 52A and 52B are connected to the motor 52 at opposite ends of the motor cylinder. The valve 52V is provided with three sets of connections respectively designated R, N and E. With the valve 52V in the N position shown in Fig. 8, the motor 52 is said to be in a neutral position, the N connections blocking each of the ports 52A, 52B, 52P and 52X. To retract the piston rod 50 into the cylinder of the motor 52, the valve 52V is manually moved to place the R connections in alignment with the various ports. In this connection, the port 52P is placed in communication with the port 52B to supply pressure to the right-hand side of the piston of the motor 52, thereby driving the piston to the left to retract the piston rod 50 into the cylinder. At this time, the chamber at the left-hand side of the piston of the motor 52 is connected through the port 52A to the exhaust port 52X to thereby permit fluid to flow from the left-hand chamber of the motor 52 to the inlet side of the pressure source 160. To move the piston in the opposite direction, the valve 52V is manually moved to place the E connections in alignment with the valve ports. With the E connections in alignment with the valve ports, pressure from the source 160 passes from the port 52P to the port 52A and thence to the left-hand side of the piston of the motor 52. Application of pressure to the left-hand side of piston drives the piston to the right to extend the piston rod 50 from the motor. In this connection, the port 52B is connected to the exhaust port 52X to drain the right-hand motor chamber.

To enable the piston of the motor 52 to travel at a faster rate during the return stroke, the left-hand chamber of the motor is connected to the return side of the source 160 by a hydraulic line 162 which bypasses the valve 52V. The flow of fluid from the motor 52 through the line 162 is normally blocked by a one-way check valve 164 but when pressure is applied to the right-hand chamber of the motor 52, the valve 164 is opened by a pilot 166 which is connected to the right-hand motor chamber by a line 168.

A generally similar arrangement is employed in conjunction with motor 114, two pilot operated check valves 170 and 172 being connected in parallel in a line 174 to the return side of the source 160, thus permitting the right-hand chamber of the motor 114 to be rapidly dumped.

In addition to the check valves 170 and 172, the motor 114 is provided with a flow regulating means 176 in the line leading into its left-hand chamber. The flow regulating means includes a one-way check valve 178 and a constant flow regulator 180 connected in parallel. The check valve is disposed to permit flow only in the direction toward the motor, the regulator 180 permits a controlled flow in either direction. Thus movement of the motor piston to the left in Fig. 8 is restricted to a rate dependent on the controlled rate of flow of fluid from the left-hand motor chamber through the flow regulator 180.

The operation of the structure described thus far will be set forth in terms of transferring coils of rolled strip material from the conveyor 14 to the conveyor 18. As has been previously mentioned, conventional steel mill practice finds the coils being made up of strips of varying lengths, hence the outer diameter of the cylindrical coils varies considerably between the individual coils. The variation in diameter between individual coils creates a problem in the tilting operation, since good practice indicates that each coil should be positioned by the tilting mechanism at a location somewhat above conveyor 18 so that the coil may be gently lowered upon the conveyor.

The manner in which this is accomplished may be best appreciated by reference to Figs. 9, 10 and 11 of the application drawings. In these figures, Fig. 9 shows the operation of carriages 44 and 62 during the handling of a coil of maximum diameter while Fig. 10 shows the operation of the carriages during the handling of a coil of minimum diameter. Figs. 9 and 10 are structurally aligned upon the sheet and thus, from a comparison of these figures the manner in which the carriages are positioned to compensate for variations in coil diameter may be appreciated.

Referring first to Fig. 9, a coil of maximum diameter is conveyed along the conveyor 14 and the driving mechanism of conveyor 14 is stopped when the center line of the maximum diameter coil reaches a predetermined point along the conveyor. Initially, the respective piston rods of all the motors are located in their fully retracted positions, and all valves are in their neutral (N) positions. After the conveyor 14 has been stopped, the operator manipulates the valve 52V to adjust carriage 44 to a preselected location beneath the maximum diameter coil. Since the carriage 44 is fully retracted at the start of the operation, the operator will normally actuate valve 52V to dispose connection E in the hydraulic circuit to motor 52. When the carriage 44 is disposed in the correct position beneath the maximum diameter coil, the valve 52V is returned to the neutral position to temporarily hold the carriage 44 at the selected location. The valve 74V is then actuated to establish the E connections to the motor 74, thus driving the piston rod 72 of the motor 74 to its fully extended position to drive the carriage 62 up the respective inclined surfaces 54 and 56 and thereby elevate the maximum diameter coil clear of the conveying surface of the conveyor 14.

After the coil has been elevated clear of the conveyor, the valve 54V is again actuated to the E position to fully extend the piston rod 50, thereby positioning the carriage 44 in the extreme right-hand position indicated in dotted lines in Fig. 9. With both piston rods 50 and 72 fully extended, the coil is located in the correct position to be engaged by the tilting assembly 16. At this time, the platform 70 of the carriage 62 supports the coil slightly above the coil end engaging plates 122 of the tilting assembly. The valves 52V and 74V are then returned to the N or neutral position to maintain their respective motors 52 and 74 in the last mentioned conditions.

At this time, the coil is said to be located in its delivery position with respect to the conveyor 14, the delivery position may be described generally as being somewhat above and beyond the discharge end of the conveyor 14. In order to be certain that the coil, when tilted by the tilting mechanism 16, arrives at a position which is somewhat above the conveying surface of the conveyor 18, all coils transferred by the carriages 44 and 62 are moved to a delivery position at which the leading edge of the coil is located at a position which is common to coils of all diameters handled by the apparatus. The leading edge of the coil is indicated in Figs. 9 through 11 by the reference LE, and is an imaginary line extending vertically up the forward side surface of the coil representing the line of tangency between the coil and an imaginary vertical plane perpendicular to the direction of movement of the coil upon the conveyor 14. The manner in which the leading edge of the coil is located at a position common to coils of all diameters may be best appreciated by following the operation of the transfer mechanism upon a coil of minimum diameter, as shown in Fig. 10.

In Fig. 10, a coil of minimum diameter is conveyed by the conveyor 14 to a position where the center line of the coil is located at a selected position upon the conveyor. The center line of the minimum diameter coil is then in the same position as was the center line of the coil of maximum diameter. In other words, all coils are indexed along the conveyor 14 until the coil center line reaches a predetermined point along the conveyor.

With a coil of minimum diameter, the carriage 44 will be in a correct position when it is in its extreme left-hand position, hence the initial step in transferring the minimum diameter coil is to move the valve 74V to its E position to drive the carriage 62 upwardly along the inclined surfaces to elevate the minimum diameter coil clear of the conveyor 14. After the minimum diameter coil has been elevated, the valve 52V is moved to its E position to drive the carriage 44 to the extreme right-hand position indicated in broken lines in Fig. 10. When the carriage 44 arrives at the delivery position, the leading edge of the minimum diameter coil will be located in the exact position previously occupied by the leading edge of the maximum diameter coil, as best seen by reference to the right-hand portion of Fig. 11.

From the foregoing, it is believed apparent that coils of intermediate diameter can be located in the delivery position in the same manner. All coils handled on the conveyor 14 are indexed to a position where the center line of the coil is located at a selected position. The carriage 44 is then extended—i.e., moved to the right—to a position where the carriage bears a relationship to the specific coil which is constant for coils of all diameters. This position finds the right-hand or forwardmost edge of the carriage 44 located slightly forwardly of the leading edge of the coil. The position is selected such that as the carriage 62 is moved upwardly along its inclined surfaces the forwardmost edge of the platform 70 will be aligned with the leading edge of the coil as the carriage 62 engages the coil to elevate it clear of the conveyor. The variations in coil diameters are thus compensated for by the initial adjustment of the carriage 44 prior to the operation of the carriage 62. Because of the flexibility of the system provided by the initial adjusting movement of the carriage 44, the indexing of coils upon the conveyor 14 is not especially critical, the operator merely stopping the coils at some point on the conveyor and then adjusting the carriage 44 so that the elevating engagement of the carriage 62 with coil is such that the forwardmost end of the platform 70 is aligned with the leading edge of the coil as the carriage 62 elevates the coil clear of the conveyor 14. When this is accomplished, the leading edge of the coil is moved to a position common to coils of all diameters when the carriage 44 is moved to its extreme right-hand or forwardmost limit of movement.

The location of the leading edge of the coil when the coil is in its delivery position is related to the tilting mechanism 16 in a manner such that upon tilting of the coil, the leading edge of the coil is moved from its vertical position into a horizontal position which is spaced above the conveying surface of conveyor 18. In order to accomplish this where the coil diameter may vary considerably, it is necessary to perform two functions on the coil during the movement of the coil from the delivery position to the conveyor 18. First, the coil must be supported so that the leading edge is maintained in a fixed relationship to the tilting mechanism 16 during tilting movement of the mechanism. Second, since the coil will arrive at a receiving position wherein the leading edge of the coil is located above the surface of conveyor 18, means must be provided to lower the coil from this receiving position onto the conveyor surface.

Both of these functions are performed by the saddle members 146 of the tilting mechanism.

Returning to the handling of a maximum diameter coil, after the coil has been located in the delivery position, valve 148V is actuated to establish the E connections, thereby extending piston rods 154 from their respective cylinders. The piston rods are extended until the saddle members 146 move into engagement with the side surface of the maximum diameter coil. At this time, the valve 148V is moved to the neutral (N) position to hold the piston rods 154, and thereby the saddle members 146, in engagement with the side surface of the coil. Valve 114V is then moved to its E position to extend the piston rod 112 fully from the cylinder. This actuation of the motor 114 pivots the tilting assembly 16 in a clockwise direction about the stub shafts 94 and tilts the maximum diameter coil into a position wherein the axis of the coil extends in a horizontal direction. After the tilter mechanism 16 lifts the coil off of carrier 62 then valves 74V and 52V are moved to their respective R positions to fully retract both carriages 62 and 44. When the tilting mechanism 16 arrives at its limit of movement in the clockwise direction, the leading edge of the maximum diameter coil is located in a horizontal position slightly above the conveying surface of the conveyor 18. The valve 148V is then moved to its R position to retract the piston rods 154, thereby lowering the maximum diameter coil onto the conveying surface of conveyor 18. Conveyor 18 is then actuated by means, not shown, to convey the coil clear of the tilting mechanism. Valve 114V is then moved to its R position to pivot the tilter back to its original coil receiving position.

Operation of the tilting mechanism 16 is similar for a coil of minimum diameter, the only difference being that a slightly greater extension is required of the piston rods 154 to initially engage the side surfaces of a minimum diameter coil, as can best be appreciated from Fig. 11.

In Figs. 12, 13 and 14, an article handling apparatus 10a is disclosed as being employed to transfer coils between two like conveyor sections 14a and 14b. With the exception of certain changes in the relative dimensions of various components, the transfer assembly 10a of Figs. 12 through 14 is of similar construction to the transfer assembly 10 described in the previous embodiment, hence the constructional details of the transfer assembly 10a will be described only briefly, the reference numerals employed being the same as those employed in describing the transfer assembly 10 with the suffix "a" added to each numeral.

Both of the conveyors 14a and 14b are similar in construction to the conveyor 14 of the previously described embodiment and are of more or less conventional construction. The conveyors 14a and 14b each includes a pair of spaced carrying chains, each link of the chain having a platform like apron upon which the coil may be supported in the manner best shown in Figs. 12 and 13. The conveyors 14a and 14b are arranged in in-line arrangement with the carrying runs of the respective conveyors disposed upon substantially the same level. The chains of conveyor 14a are driven by a head sprocket assembly 34a fixedly mounted upon a drive shaft 38a which is rotated by conventional driving means, not shown. A similar arrangement, not shown, may be employed to drive the conveyor 14b. The foot end of the conveyor 14b includes a foot shaft 170 upon which is mounted a foot sprocket assembly 172, the foot shaft 170 being journaled in the frame of the conveyor 14b in a manner well known in the art. A similar foot shaft assembly may be employed on the conveyor 14a.

The transfer assembly 10a of Figs. 12 through 14 differs from the transfer assembly 10 in that the track 42a upon which the carriage 44a is supported is extended well beyond the discharge end of the conveyor 14a to a delivery location well beyond the receiving end of the conveyor 14b. The extended length of the track 42a requires an elongated hydraulic driving motor 52a, since the motor 52a must be capable of driving the carriage 44a between the position disclosed in Fig. 13 and the position shown in Fig. 14.

Other than the relative elongation of the track 42a and the driving motor 52a, the transfer assembly 10a may be considered to be identical with the previously described transfer assembly 10. As is the case with transfer assembly 10, the transfer assembly 10a includes a carriage 44a supported by a plurality of rollers 46a for movement along a track 42a. A second carriage 62a is mounted upon the carriage 44a by means of rollers 64a and 66a for movement along an inclined track section 54a and 56a. An expansible chamber motor 74a is mounted upon the carriage 44a to drive the carriage 62a up and down the inclined track section in exactly the same manner as the motor 74 of the transfer assembly 10. As is the case with the transfer assembly 10, the carriage 62a of the Figs. 12 through 14 embodiment is movable between a lowered position (Fig. 13) wherein the coil supporting platform 70a is disposed below the conveying surface of the conveyor 14a and an upper position (Fig. 14) wherein the carrying platform 70a is elevated above the conveying surface of the conveyor.

The operation of the Figs. 12 through 14 embodiment is believed to be apparent from a comparison of Figs. 13 and 14. Each of the motors 52a and 74a is connected to a pressure source through a three-position valve in the same manner as the motors 52 and 74 of the Figs. 1 through 10 embodiment. Coils conveyed upon the conveyor 14a are driven along the conveyor and indexed to a location where the center line of the coil is located in a predetermined relationship to the discharge end of the conveyor 14a. The carriage 44a is then adjusted to a selected position beneath the coil by suitable operation of the motor 52a. When the carriage 44a has been located beneath the coil, the motor 74a is then actuated to drive the carriage 62a from the full line position of Fig. 13 upwardly along the inclined track surfaces 54a and 56a to the dotted line position of Fig. 13. This operation of the motor 74a elevates the coil above the conveying surface of the conveyor 14a.

The motor 52a is then actuated to fully extend its piston rod 50a, thus moving the carriage 44a from the Fig. 13 position to the position illustrated in Fig. 14. At this stage of the operation, the coil is supported upon the carriage 62a at a location slightly above the conveying surface of the conveyor 14b. The motor 74a is then actuated to drive the carriage 62a from the full line position of Fig. 14 to the dotted line position of Fig. 14, thus lowering the coil onto the conveying surface of the conveyor 14b. The motor 52a is then actuated to return the carriage 44a to the Fig. 13 position. The conveyor 14b is subsequently actuated to move the transferred coil along the conveyor to a location clear of the coil receiving position.

The Figs. 12 through 14 embodiment is especially useful in transferring coils or other articles from one conveyor to another where the rate of movement of the coils along the respective conveyors may differ. In the Figs. 12 through 14 example, the conveyor 14b might be a storage conveyor while the conveyor 14a might intermittently convey coils through a cooling process.

Another embodiment of the invention is disclosed in Figs. 15 through 19 inclusive. In this embodiment, coils are transferred from a first conveyor 214 to a second conveyor 314 which has its carrying run disposed at a level substantially above the level of the carrying run of the conveyor 214. While this embodiment will be described in terms of transferring coils from the conveyor 214 to the conveyor 314, it will become apparent from the description that the structure is equally adapted to transfer the coils in a reverse direction—that is from the conveyor 314 to the conveyor 214.

In this embodiment, the conveyors 214 and 314 are again disclosed as being similar in construction to the conveyors 14, 14a and 14b of the embodiments described above. In this instance, each of the conveyors 214 and 314 has a transfer assembly, 210 and 310, respectively, which is similar to the transfer assembly 10 of the Figs. 1 through 10 embodiment. As was the case with the transfer assembly 10a of the Figs. 12 through 14 embodiment, the transfer assemblies 210 and 310 are similar in construction to the transfer assembly 10 of the first embodiment and a corresponding set of reference numerals will be employed to indicate the structural features, the reference numerals employed in Figs. 1 through 10 being employed in Figs. 15 through 19 with a prefix 2 or 3. It is believed that a description of the structure of the conveyors 214 and 314 and the transfer assemblies 210 and 310 would be repetitious at this point and hence these assemblies will be described solely in terms of their operation.

In the Figs. 15 through 19 embodiment, the conveyors 214 and 314 are located in in-line relationship to each other with the conveying surface of conveyor 314 disposed a substantial distance above the conveying surface of the conveyor 214. The adjacent ends of the conveyors 214 and 314 are spaced from each other in order that a lift assembly 400 may be disposed between the adjacent ends thereof.

Lift assembly 400 includes a fixed pedestal frame 402 which is provided with a vertically extending internal bore 404 which forms the cylinder of an expansible chamber motor. At its upper end, the pedestal 402 includes a horizontally extending flange 406 which is bored at either end to slidably receive a pair of guide or check rods 408. The check rods 408 are fixedly secured to and move with the lift platform assembly 410 which includes a lift piston 412 fixed to the platform assembly 410 and slidingly received within the internal bore 404 in the pedestal. By connecting the chamber defined by the bore 404 to a suitable source of hydraulic pressure, the lift platform 410 may be raised and lowered between the position shown in Fig. 16 and the position shown in Fig. 17. Adjustable nuts 414 on the lower ends of the check rods 408 define an upper limit of movement to the lift platform 410, while the lower limit of movement of the platform 410 is defined by the engagement between the platform and the cushions 416 located upon the upper surface of the flange 406.

As best seen in Fig. 19, the upper or coil engaging surface 420 of the platform 410 is recessed as at 422 to provide an opening extending entirely through the lift platform 410 (see Figs. 18 and 19) within which the carriages of the transfer assemblies 210 and 310 may enter during the operation of transferring coils to and from the lift platform. At the bottom of the recess 422, a track section 424 is fixedly secured to the lift platform 410 and, as best seen in Figs. 16 and 17, is so located as to define an extension of either the track 242 or the track 342, depending upon the position at which the lift platform is located.

The hydraulic control system for the Figs. 15 through 19 embodiment is quite similar to the control system disclosed for the Figs. 1 through 10 embodiment. Each of the transfer assemblies 210 and 310 is controlled by respective three-position valves in the same manner as the transfer assembly 10 of the Fig. 1 embodiment. The lift assembly 400 may be provided with a similar arrangement in a manner well known to those skilled in the art.

In the operation of the Figs. 15 through 19 embodiment, both transfer assemblies and the lift are initially disposed in their retracted position. Coils are fed along the conveyor 214 and indexed on the conveyor to a selected location. The transfer assembly 210 is then operated to remove each coil from the conveyor and to transfer it to the lift assembly in the same fashion that the transfer assembly 10 is operated to transfer a coil to the tilter 16. With the lift assembly in its lower position, the track section 424 defines an extension of the track 242, and thus the transfer assembly 210 may move to its extreme rightwardmost limit indicated in broken lines at 244b in Fig. 16.

At this time, the coil is elevated slightly above the coil engaging surface 420 of the lift assembly, and is somewhat to the right of its final position with respect to the assembly, as indicated in broken lines at 12a in Fig. 16. The carriage 262 is then retracted to its lowered position, thus lowering the coil onto the surface 420, at which time the coil assumes the position shown in broken lines at 12b in Fig. 16. The carriage 244 is then retracted to the full line position shown in Fig. 16.

After the transfer assembly 210 has been returned to the full line position of Fig. 16, the lift assembly 400 is operated to elevate the coil into position for further handling by the transfer assembly 310. When the lift arrives at its upper limit, the track section 424 is aligned with the track section 342 as shown in Fig. 17.

The transfer assembly 310 is then actuated to move the carriage 344 to its extreme left-hand position, illustrated in full lines in Fig. 18. The carriage 362 is held in its retracted position until the carriage 344 reaches its left hand limit and is then actuated to move upwardly under the coil to elevate the coil clear of the surface 420 of the lift. This step in the operation is illustrated in full lines in Fig. 18.

With the coil supported upon the carriage 362, the carriage 344 is then retracted to the right into the broken line position 344d of Fig. 18. This movement of the transfer assembly 310 positions the coil slightly above the conveying surface of the conveyor 314 at the location indicated in broken lines at 12d of Fig. 18. The carriage 362 is then retracted to the right to lower the coil onto the conveying surface of the conveyor 314 as indicated in broken lines at 12e of Fig. 18.

It is believed apparent from the foregoing description that by reversing the various operating steps, transfer of coils could be performed in the reverse direction.

While I have described three embodiments, it will be apparent to those skilled in the art that the invention is capable of application to systems other than those set forth above. Therefore, it is to be understood that the foregoing specification is exemplary rather than limiting and the true scope of the invention is that defined in the following claims.

I claim:

1. An assembly for transferring articles from a conveyor, said assembly comprising a first carriage mounted for reciprocating movement along a path extending longitudinally of said conveyor, control means for moving said first carriage to selected positions along said path, a second carriage mounted on said first carriage for movement relative to said first carriage along an inclined path extending longitudinally of said conveyor, said second carriage being operable when located at the upper end of said inclined path to support articles clear of said conveyor, and means on said first carriage for moving said second carriage along said inclined path.

2. An assembly for transferring articles from a conveyor having a pair of spaced parallel conveying chains, said assembly comprising a first carriage mounted for reciprocating movement along a path located between said conveying chains and extending parallel to said chains, control means for moving said first carriage to selected positions along said path, a second carriage mounted upon said first carriage for movement relative to said first carriage along an inclined path located centrally between said conveying chains, an article supporting member mounted upon said second carriage, said inclined path being located with respect to said conveying chains to position said article supporting member below said chains when said second carriage is at the lower end of said inclined path and to locate said article supporting member above said chains when said second carriage is located at the upper end of said inclined path.

3. An assembly for transferring articles from a conveyor having a pair of spaced parallel conveying chains, said assembly comprising a first carriage mounted for reciprocating movement along a path located between and extending parallel to said conveying chains, control means for moving said first carriage to selected positions on said path, a second carriage mounted upon said first carriage for movement relative to said first carriage along an inclined path located centrally between said conveying chains, an article supporting member mounted upon said second carriage, said inclined path being located with respect to said conveying chains to position said article supporting member below said chains when said second carriage is at the lower end of said inclined path and to position said article supporting member above said chains when said second carriage is at the upper end of said inclined path, and reversible hydraulic motor means mounted upon said first carriage for moving said second carriage along said inclined path.

4. In combination with a conveyor assembly comprising a pair of conveying chains supported and guided upon a pair of spaced parallel rails, and a pair of head sprockets engaging said chains at a location beyond the head ends of said rails; a transfer assembly for removing articles from said conveying chains and locating said articles at selected positions beyond said head sprockets, said assembly comprising a carriage track located below and centrally between said rails and extending parallel to said rails to a location beyond said head sprockets, a first carriage mounted for movement along said track, means for moving said first carriage to selected positions along said track, a second carriage mounted upon said first carriage for movement relative to said first carriage along a vertically inclined path, an article supporting member mounted upon said second carriage, and means on said first carriage for moving said second carriage along said inclined path between a lower position wherein said article supporting member is located below said conveying chains and an upper position wherein said article supporting member is elevated above said conveying chains.

5. In combination with a conveyor assembly comprising a pair of conveying chains supported and guided upon a pair of spaced parallel rails, and a pair of head sprockets engaging said chains at a location beyond the head ends of said rails; a transfer assembly for removing articles from said conveying chains and locating said articles at selected positions beyond said head sprockets, said transfer assembly comprising a carriage track located below and centrally between said rails and extending parallel to said rails to a location beyond said head sprockets, a first carriage mounted for movement along said carriage track, means for moving said first carriage to selected positions on said track, a vertically inclined track on the upper surface of said first carriage, a second carriage mounted upon said first carriage for movement along said inclined track, and means on said first carriage for moving said second carriage along said inclined track to elevate articles clear of said conveying chains during movement of said second carriage toward the uppermost end of said inclined track.

6. In combination with a conveyor assembly comprising a pair of conveying chains supported and guided upon a pair of spaced parallel rails, and a pair of head sprockets engaging said chains at a location beyond the head end of said rail; a transfer assembly for removing an article from said conveying chains and locating said article at a selected discharge position beyond said head sprockets, said transfer assembly comprising a carriage track located below and centrally between said rails and extending parallel to said rails to a location beyond said head sprockets, a first carriage mounted for movement along said carriage track, means for moving said first carriage to selected positions on said track, a second track on the upper surface of said first carriage inclined upwardly in the direction toward said discharge position, a second carriage mounted upon said first carriage for movement along said inclined track, an article supporting member mounted upon said second carriage, said article supporting member and said inclined track being located with respect to said conveying chains to position said article supporting member below said chains when said second carriage is at the lowermost end of said inclined track and to position said article supporting member about said conveying chains when said second carriage is at the uppermost end of said inclined track, and means for moving said second carriage along said inclined track between said lowermost and uppermost positions.

7. In combination with an apron conveyor trained around a horizontally disposed cylindrical foot guide roll; and means supporting said guide roll for pivotal movement about its longitudinal axis, a coil tilting assembly for receiving coils in an upright position and loading said coils upon said conveyor with the axes of the coils extending longitudinally of said coveyor, said tilting assembly comprising a cradle mounted upon said guide roll and movable therewith, means for pivoting said guide roll about said axis to tilt said cradle between a receiving position wherein said cradle is located to support a coil in an upright position and a coil delivery position wherein said cradle is located to support a coil in a horizontal position above said conveyor, and retractable coil support means on said cradle for transferring a coil supported in said delivery position by said cradle from said cradle to said conveyor.

8. In combination with an apron conveyor trained around a horizontally extending cylindrical foot guide roll; means supporting said guide roll for pivotal movement about its longitudinal axis, and a coil tilting assembly comprising an arm assembly mounted upon said guide roll at both sides of said conveyor to define a coil supporting cradle, means for moving said guide roll and said cradle about said axis between a receiving position wherein said cradle is located to support a coil in an upright position and a delivery position wherein said cradle is located to support a coil above said conveyor with the longitudinal axis of the coil extending parallel to said conveyor, and means for lowering a coil supported by said cradle in said delivery position from said cradle onto said conveyor.

9. In combination with an apron conveyor trained around a horizontally extending cylindrical foot guide roll, and means supporting said guide roll for pivotal movement about its longitudinal axis, a coil supporting cradle fixedly mounted upon said guide roll and comprising like arm assemblies extending transversely of the axis of said guide roll at each side of said conveyor, each arm assembly including a coil end supporting arm and a coil side supporting arm extending perpendicularly to said end supporting arm, means for moving said guide roll and said cradle about said axis between a receiving position wherein the coil side supporting arms of said cradle extend in a vertical direction and a delivery position wherein said coil side supporting arms extend parallel to said conveyor on both sides thereof, and a retractable coil engaging member mounted upon each of said coil side supporting arms for supporting a coil upon said cradle at a predetermined position with respect to said cradle during pivotal movement thereof.

10. A coil tilting assembly for receiving coils of differing diameter in an upright position and loading said coils upon a conveyor with the axes of the coils extending longitudinally of the conveyor, said tilting assembly comprising a cradle mounted for pivotal movement about a horizontal axis, means for moving said cradle about said axis between a coil receiving position and a coil delivering position, retractable means on said cradle movable to selected extended positions in accordance with the diameter of a coil supported on said cradle for locating said coil upon said cradle to position the lowermost portion of the side surface of the coil at a predetermined location above said conveyor when said cradle is moved by said moving means to said delivering position, and means for retracting said retractable means to lower the coil from said predetermined position onto said conveyor.

11. A coil handling conveyor system comprising a conveyor for moving coils with the longitudinal axes of conveyed coils extending in a generally horizontal direction, means for positioning coils of differing diameters adjacent said conveyor with the leading edges of the coils located at a common upright position with respect to said conveyor, means for tilting a coil from said upright position to a horizontal delivery position above said conveyor, and supporting means on said tilting means for lowering said coil from said delivery position onto said conveyor.

12. A coil handling conveyor system comprising a conveyor for moving coils with the longitudinal axes of conveyed coils extending in a generally horizontal direction, means for positioning coils of differing diameters adjacent said conveyor with the leading edges of the coils located at a common upright position with respect to said conveyor, means for tilting a coil from said upright position to a horizontal delivery position above said conveyor, said tilting means comprising a coil supporting cradle mounted for pivotal movement about a horizontal axis, means for driving said cradle in pivotal movement about said horizontal axis to move said coil between said upright position and said delivery position, and supporting means on said cradle for lowering said coil from said delivery position onto said conveyor.

13. A coil handling conveyor system comprising a conveyor for moving coils with the longitudinal axes of conveyed coils extending in a generally horizontal direction, means for positioning coils of differing diameters adjacent said conveyor with the leading edges of the coils located at a common upright position with respect to said conveyor, means for tilting a coil from said upright position to a horizontal delivery position above said conveyor, said tilting means comprising a cradle mounted for pivotal movement about a horizontal axis, means for driving said cradle in pivotal movement about said axis to move said coil between said upright position and said delivery position, supporting means on said cradle movable into engagement with the side surfaces of a coil having its leading edge located in said upright position to support said coil in a fixed position relative to said cradle during tilting movement of said cradle between said upright position and said delivery position, and means for retracting said supporting means to lower the coil from said delivery position onto said conveyor.

14. A coil handling conveyor system comprising a conveyor for moving coils from a receiving station located at one end thereof with the longitudinal axes of the conveyed coils extending longitudinally of the conveyor, means for positioning coils of differing diameters at said receiving station with the leading edges of the coils located at a common upright position with respect to said conveyor, means located at said one end of said conveyor for tilting a coil located at said receiving station by said positioning means to locate said coil at a horizontal delivery position above said conveyor, and supporting means on said tilting means for lowering said coil from said delivery position onto said conveyor.

15. Article handling apparatus for transferring articles from a first conveyor to a second conveyor with said second conveyor having a conveying surface located at a different elevation than the conveying surface of said first conveyor, the receiving end of said second conveyor being located adjacent the discharge end of said first conveyor, said apparatus comprising a carriage mounted for movement along a path extending longitudinally of said first conveyor to an article delivery position located between the discharge end of said first conveyor and the receiving end of said second conveyor, means for moving said carriage to selected positions along said path, article supporting means mounted on said carriage for movement between a retracted position wherein said article supporting means is disposed below the conveying surface of said first conveyor and an article supporting position wherein said article supporting means is disposed above the conveying surface of said first conveyor, means on said carriage for moving said article supporting means between said retracted position and said article supporting position, means at said delivery position for removing articles from said article supporting means, moving said articles in a vertical direction to the level of the conveying surface of said second conveyor, tilting said articles during movement thereof in said vertical direction, and loading said articles upon said second conveyor.

16. Article handling apparatus for transferring articles from a double chain conveyor having a pair of laterally spaced sprockets at its discharge end each fixed to a common horizontal shaft, said apparatus comprising track means located between and parallel to the chains of said conveyor and extending to an article delivery position located beyond the discharge end of said conveyor, said track means having a thread passing over and beyond said common horizontal shaft; a carriage mounted on the tread of said track means for movement therealong longitudinally of said conveyor, said carriage fitting between the chains of said conveyor so as to be movable past said sprockets to said article delivery position; means for moving said carriage to selected positions along said track means; article engaging means on said carriage; means for moving said article engaging means between a retracted position at which said article engaging means is located entirely below the level of the conveying surface of said chains and an article supporting position at which said article engaging means supports an article at a level above the conveying surface of said chain; and means at said article delivery position for removing an article from said article engaging means.

17. Article handling apparatus as defined in claim 16 further characterized by said carriage being located entirely below the level of the conveying surface of said chains throughout its path of movement along said track means, and means on said carriage for moving said article engaging means between said retracted and said article supporting positions.

18. Article handling apparatus as defined in claim 16 further characterized by a second conveyor having its receiving end disposed adjacent the discharge end of said double chain conveyor, and said means at said article delivery position including means for loading said article upon said second conveyor.

19. Article handling apparatus as defined in claim 18 further characterized by the conveying surface of said second conveyor being at a level different from that of the conveying surface of said double chain conveyor, and said means at said article delivery position including means for moving an article vertically.

References Cited in the file of this patent
UNITED STATES PATENTS

| | | |
|---|---|---|
| 1,715,204 | Lorenz | May 28, 1929 |
| 2,293,192 | Campbell | Aug. 18, 1942 |
| 2,590,592 | Wittemann | Mar. 25, 1952 |
| 2,664,992 | Bahney | Jan. 5, 1954 |
| 2,678,715 | Boehm | May 18, 1954 |
| 2,732,057 | Temple | Jan. 24, 1956 |
| 2,739,691 | Boehm | Mar. 27, 1956 |